Oct. 11, 1949.    C. JOBST    2,484,712
MOLDING MACHINE
Filed July 6, 1945    4 Sheets-Sheet 1

Fig. I.

Inventor
CONRAD JOBST
By Rule and Hoge
Attorneys

Inventor
CONRAD JOBST

Oct. 11, 1949.                    C. JOBST                    2,484,712
                              MOLDING MACHINE
Filed July 6, 1945                                    4 Sheets-Sheet 4

Inventor
CONRAD JOBST

Patented Oct. 11, 1949

2,484,712

UNITED STATES PATENT OFFICE 2,484,712

MOLDING MACHINE

Conrad Jobst, Toledo, Ohio, assignor, by mesne assignments, to Owens-Illinois Glass Company, Toledo, Ohio, a corporation of Ohio Application July 6, 1945, Serial No. 603,448

18 Claims. (Cl. 18—16)

My invention relates to molding or die-casting machines in which the mold sections or die faces are brought together and held in contact under the high pressure required while the molding material therein is being cooled or set and hardened, such pressure being used to prevent any opening movement of the molds of flashing of the molding material.

An object of the invention is to provide improved means for bringing the mold sections together and holding them closed under the required high pressure. Such means includes motor driven mechanism for bringing the mold sections or dies to a substantially closed position and, as the molds are about closed, applying added power at a greatly reduced speed through suitable speed reduction gearing and clutch mechanism. The invention provides a driving motor operating through such reduction gearing in combination with means for automatically shutting off the power or driving torque of the motor a predetermined time interval after the motor is connected to the clutch mechanism. Timing mechanism is provided for regulating and limiting the length of time during which such torque is applied and thereby regulating and controlling the degree of pressure applied for holding the mold sections closed.

The invention in the form herein illustrated, is applied to an injection molding machine of the type disclosed in my Patent No. 2,372,833, April 3, 1945, Injection molding machine, such type of machine being adapted for molding organic materials of the thermosetting type which are injected into the molds in a plastic condition and which set or harden while under heat and pressure within the molds. In molding such materials, high pressures are developed within the molds and it is the practice to hold the mold sections together under a high pressure. Hydraulic mechanism is commonly employed for this purpose, but the nature of such mechanism involves inherent difficulties. High pressure may be maintained in the hydraulic transmission system during the closing movement of the mold sections but is difficult to maintain after the molds are closed. Sudden and high pressures may be developed within the closed molds, particularly due to expansion of the molding material, and the resulting back pressure in the hydraulic system operates through the overflow or safety valves to dissipate the pressure needed for holding the molds closed. An object of the present invention is to overcome such difficulty and provide improved means by which the molds are securely held closed in a manner to effectively resist any possible pressures developed within the molds.

Hydraulic motors as employed in the prior art, commonly apply hydraulic pressure through toggle levers or mechanism by which the pressure is distributed and applied adjacent to the four corners of the movable die plate. Such mechanism is difficult to adjust in a manner to obtain an evenly distributed pressure. The difficulty increases with increase in size of the machines. toggle links or connections are also subject to rapid wear in a manner quickly to reduce and unbalance the pressure applied therethrough.

A further object of the present invention is to overcome such difficulties and to this end the invention provides novel means for transmitting power for closing the mold sections and holding them closed. Such means includes a pair of power transmitting elements telescopically arranged, power being transmitted from one to the other of said elements through bearing balls between helical surfaces formed on said elements. A further desideratum obtained by such construction is the provision of means whereby the application of pressure to the movable mold section is made centrally thereof in a manner to maintain a uniformly distributed pressure at the meeting faces of the mold sections.

A further purpose of such a construction is the provision of a metal-to-metal contact between the mold sections, the power transmitting elements and the supporting frame in which they are mounted, such that the power transmitting metals are, by the tension developed therein, well fortified against sudden and high presssures produced in the molds or developed in the molding materials.

A further object of the invention attained by the construction herein disclosed in which the mold-closing movement is transmitted through helical driving surfaces, consists in placing the metal supporting frame and transmitting mechanism under an elastic compression in a manner to cause an even distribution of the pressure throughout the contacting area of the mold faces.

A further object of the invention is to provide improved safety mechanism for protecting the molds by preventing a destructive mold-closing pressure being developed in the event of any obstructing material between the molds. Owing to the high pressure employed in the mold-closing operations, any fragments of hardened molding material or other foreign matter coming between the mold faces, is liable to mutilate the molds. The present invention provides means by which back pressure due to such foreign material will operate automatically to reverse the mold-closing motor and open the mold. A further object obtained in the use of such safety mechanism consists in safeguarding the molds against any excessive accumulation of sediments or deposits on the meeting surfaces of the mold sections. In machines of the type to which my invention is applied, using thermoplastic molding compounds, certain gases are developed by the heating of the molding compound and are condensed on the mold faces and thereby gradually build up a coating of foreign matter. Such coating or "coining" of the die faces causes automatic operation of the safety mechanism to open the mold, thus giving a danger signal to the workman.

Other objects of the invention will appear hereinafter.

Referring to the accompanying drawings.

Figure 1:
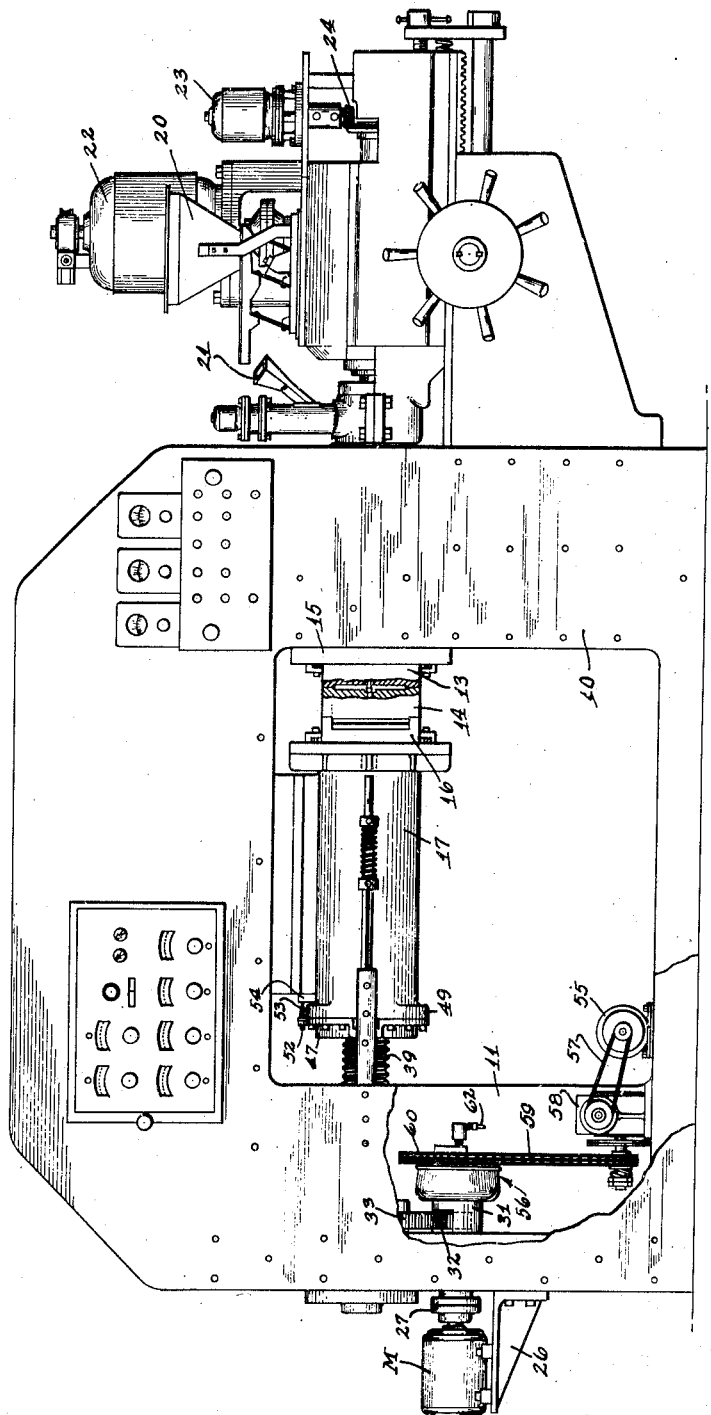
Fig. 1 is a side elevation of a machine embodying my invention, a portion of the frame being broken away.

The framework of the machine comprises vertical, parallel side plates 10, end abutment plates including a plate 11 at the left-hand end of the machine, and a longitudinal tie plate 12 extending between the plates 10 and bolted or otherwise secured to the abutment plates. The die plates or mold sections include a fixed section 13 and a movable section 14. The section 13 is attached to a platen 15 having a fixed mounting on the machine frame. The movable section 14 is mounted on a plate 16 secured to and forming part of a mold carriage 17 mounted for horizontal reciprocating movement lengthwise of the machine for moving the die plate 14 to and from a closed position. The carriage 17 is supported on ball bearings including bearing balls 18 which run in raceways or tracks 18ᵃ and 18ᵇ (Fig. 3) mounted on the frame plate 12 and carriage respectively, the bearing balls being held in position by spacing strips 19.

Injection mechanism, such as that shown, for example, in the above identified patent, serves to feed the molding material to the molds. The molding material, which may be an organic thermosetting molding compound, is supplied in powdered or granular form and is heated and reduced to a plastic condition as it is fed forward to the mold. The molding material is fed from a hopper 20 in measured quantities to a chute 21, passes down through the chute, and is then fed forward by the injector plunger. A motor 22 operates to reciprocate the injector plunger for feeding the material forward while a motor 23 operates through driving gearing 24 to rotate the plunger for distributing the material, all as disclosed in said patent.

The carriage 17 is reciprocated for opening and closing the dies by an electric motor M (Figs. 1 and 4) mounted on a bracket 26 on the machine frame. The motor is connected through a coupling 27 to a drive shaft 28, the latter mounted in ball bearings 29 and 30 within a bearing sleeve 31 mounted in the abutment plate 11. A spur pinion 32 keyed to the shaft 28, drives a gear 33 keyed to a carriage driving element 35 in the form of a shaft. The outer end of the shaft is mounted in ball bearings 36 in a bearing block 37 mounted in the abutment plate 11 to which it is secured by screw bolts 38.

The shaft 35 is formed with a spiral or helical thread 39 and cooperates with a driven element 40 in the form of a tubular block or sleeve through which the driving element extends. The member 40 is formed with an internal helical thread complemental to the thread 39. Bearing balls 41 running in the helical groove provided by said threads, provide a driving connection between the driving and driven members 35 and 40. The member 40 is mounted for limited lengthwise movement within the tubular end portion 42 of the carriage 17 for a purpose described hereinafter. A key or spline 43 prevents rotative movement of the block 40 within the carriage.

Figure 3:
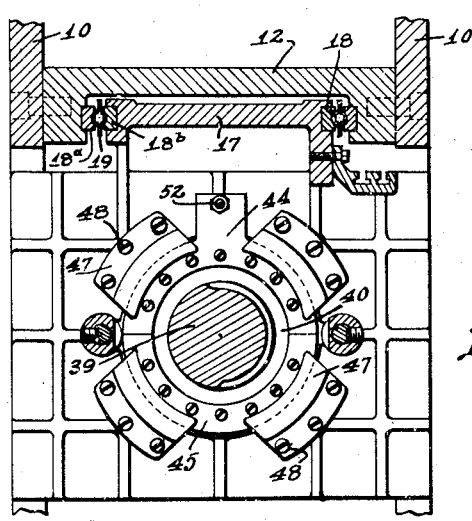
Fig. 3 is a cross section at the line 3—3 on Fig. 4, on a smaller scale.
Figure 4:
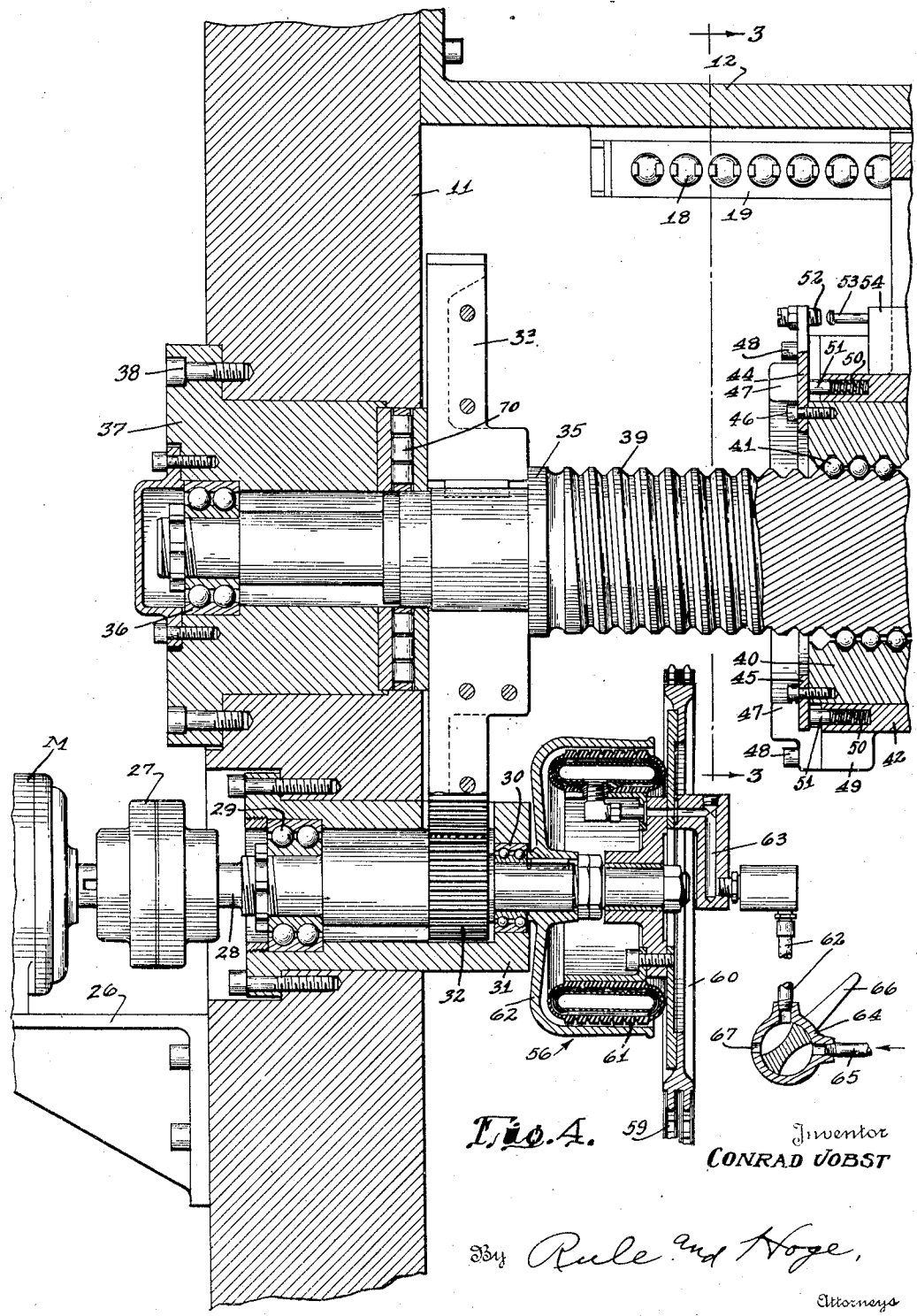
Fig. 4 is a sectional elevation complementary to Fig. 2 showing the outer half of the helical driving element and driving mechanism therefor.

Attached to the outer end face of the block 40 by screw bolts 46 are upper and lower arc-shaped plates 44 and 45 respectively. A series of segmental stop plates 47 are attached to the mold carriage by screw bolts 48 threaded into lugs 49 formed on the member 42. The stop plates 47 overhang the plates 44, 45 as shown in Fig. 3 and limit outward movement of the block 40 relative to the carriage as shown in Fig. 4. The block 40 is yieldingly held in such outward position by an annular series of coil springs 50 mounted in bores in the member 42 and held under compression between the latter and guide pins 51 on the plates 44, 45. A contact screw 52 adjustably mounted in the plate 44 is arranged to engage a pin 53 of a micro-switch 54 mounted on the carriage. The compression springs 50 hold the block 40 in its outward position (Fig. 4) during the reciprocating movements of the carriage, the block 40 being moved inward against the compressive force of the springs 50 by the driving member 39 after the carriage is arrested in its mold-closing movement by the mold faces being brought together.

Mechanism for driving the mold carriage during its final mold-closing movement and applying and maintaining a high mold-closing pressure, includes a supplemental electric motor 55 (Fig. 1) having driving connection with the shaft 35 through gearing including a pneumatic clutch device 56 (Fig. 4). The motor 55 operates through a belt 57 and speed reduction gearing in a gear box 58 to drive a pair of chains 59 trained over a sprocket wheel 60 attached to one member 61 of the clutch. The other member 62 of the clutch is keyed to the shaft 28 so that when the clutch members are connected, the motor 55 has driving connection with the carriage driving shaft 35.

The clutch may be of conventional construction. In the form illustrated, the inner clutch member 61 is an expansible tube of rubber or the like. Air under pressure is supplied through a pipe 62 which communicates with a conduit 63 extending to and opening into the tube. The air pressure expands the tube into frictional driving contact with the surrounding shell 62 or clutch member. The supply of air under pressure is controlled by a clutch control valve 64. Air under pressure is supplied from a suitable source through a pipe 65 to the valve chamber. The valve lever 66 is operable to connect the pressure pipe 65 with the pipe 62 for supplying air pressure for operating the clutch. When the lever 66 is moved to the position shown, it cuts off the air supply and opens the pipe 62 to an exhaust port 67, thereby dissipating the pressure in the tube 61 and disconnecting the clutch members.

The clutch is operated to effect a driving connection between the motor 55 and the carriage driving shaft 35, and the motor 55 is energized, both as the carriage has about completed its forward or mold-closing movement. The motor is thus caused to operate through speed reduction gearing to apply a more powerful driving torque to the shaft 35, thereby applying a high pressure to the mold. This pressure reacts through the shaft 35, thrust bearings 70 and the bearing block 37 bolted to the abutment plate 11 so that these metal parts are placed under a stress by which the mold sections or dies are positively held against any opening movement and effectively prevent any separation of the die faces under high pressures developed within the mold.

Figure 5:
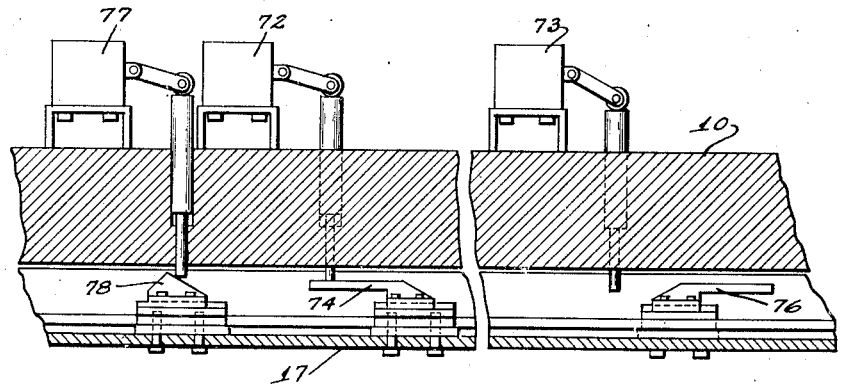
Fig. 5 is a detail showing certain cam-operated switches.

Referring to Fig. 5, the operations of the motors are controlled in part by limit switches including a forward limit switch 72 and a rear limit switch 73 mounted on the machine frame 10. The switch 72 is actuated by a cam 74 adjustably mounted on the mold carriage 17 in position to operate the switch as the carriage nears the limit of its forward or mold-closing movement, thereby introducing resistance into the field of the main motor M as hereinafter described, for reducing the driving torque and slowing down the motor. The rear limit switch 73 is operated by an adjustable cam 76 as the mold carriage nears the completion of its opening movement, thereby opening the motor circuit and resetting the controls for a new cycle of operations, all as hereinafter set forth. A microswitch 77 is actuated by a cam 78 adjustable on the mold carriage. The purpose of this switch will appear hereinafter.

*Operation*

Figure 6:
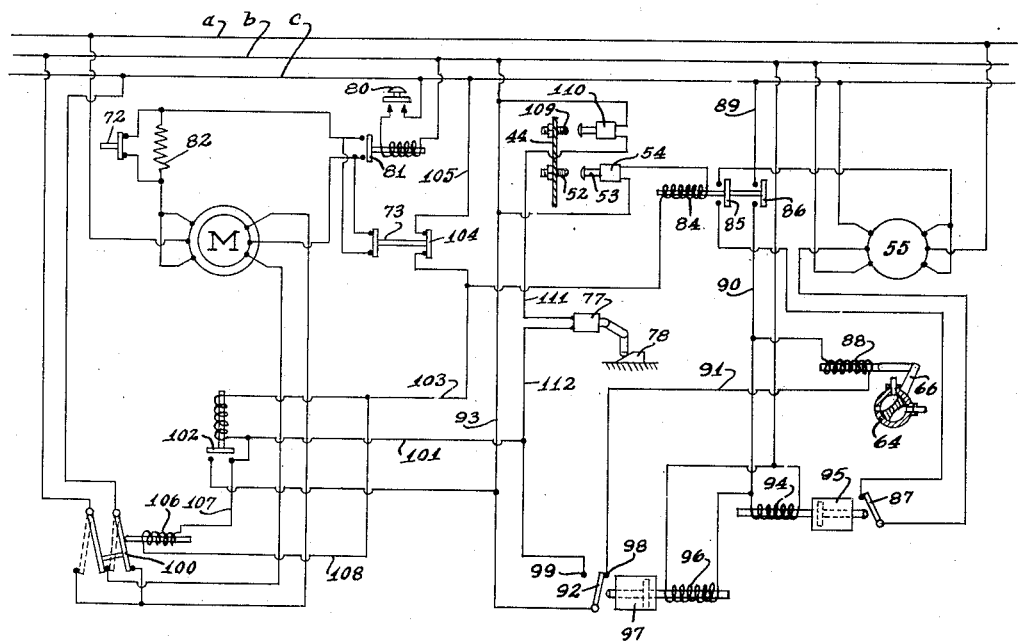
Fig. 6 is a wiring diagram of the electrical mechanism.

A cycle of operations of the machine is as follows:

Referring to the wiring diagram (Fig. 6), electric current for operating the motors and controls is supplied through the mains *a*, *b*, and *c* of a three phase system. Assuming the mold carriage to be in its retracted position, the operator presses a push button 80, thereby operating a relay switch 81 which closes the field circuit for the main motor M. Said motor starts and drives the carriage forward. As soon as the carriage starts its forward movement, the rear limit switch 73 is released from its cam 76 (Fig. 5) allowing it to close and short circuit the switch 81 so that the motor circuit is maintained independently of the push button 80.

As the mold carriage nears the limit of its forward travel, the forward limit switch 72 is opened by its cam 74 and cuts a resistance 82 into the field circuit of the motor, thereby reducing the torque of the motor and slowing it down. When the meeting faces of the mold sections or dies are almost together, as for example, a thousandth of an inch apart, the microswitch 77 is opened by its cam for a purpose which will presently appear.

Figure 2:
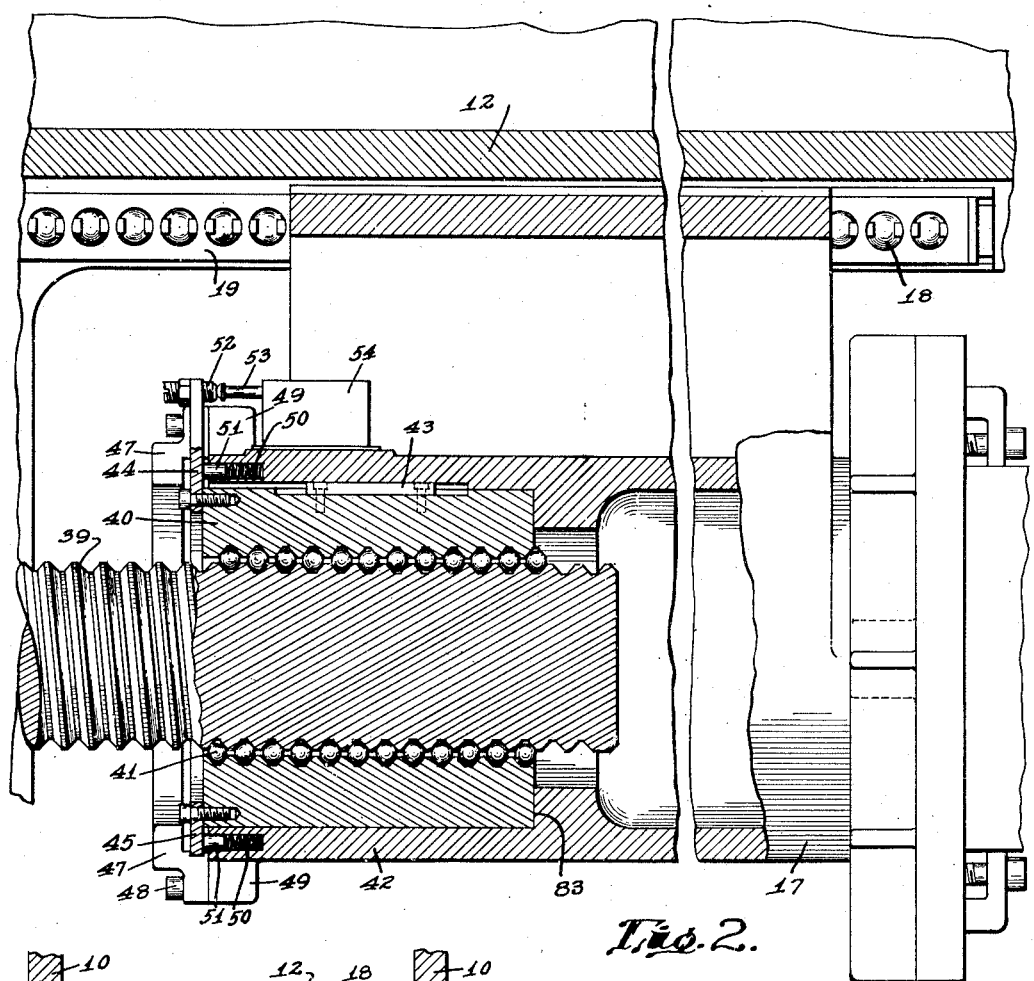
Fig. 2 is a fragmentary part-sectional elevation on a comparatively large scale showing the inner or right-hand end portion of the helical driving element and associated parts.

During the mold-closing movement just described, the driving power is transmitted through the compression springs 50 (Figs. 2 and 4) which hold the driving member 40 in its outward position relative to the carriage as shown in Fig. 4. The continued forward movement of the driving member 40 after the mold faces are brought together closes the gap or takes up the lost motion, thereby bringing the member 40 solidly against the shoulder 83 (Fig. 2) on the carriage 17. During this final movement of the carriage driving member 40 after the mold sections are brought together, the switch contact 52 strikes the switch member 53 thereby closing the switch 54. This establishes a circuit through the magnet coil 84 of a relay comprising contact bars 85 and 86. The contact bar 85 is thus moved to closed position and establishes a circuit for the field windings of the motor 55, said circuit including a switch 87 which at this time is in closed position. The motor 55 is thereby energized. At the same time the contact bar 86 establishes a circuit for the coil of an electromagnet 88 operatively connected to the clutch control valve 64. This circuit may be traced from the main *c* through conductor 89, contact 86, wire 90, coil 88, wire 91, switch 92 and wire 93 to main *b*. The magnet 88 operates the valve 64 so that the pneumatic clutch is operated to effect a driving connection between the motor 55 and the carriage driving shaft 35. The motor 55 thus operates to apply an increased driving torque so that the mold is held closed in a manner heretofore described.

The closing of the relay contact bar 86 also establishes a circuit including the magnet coil 94 of a timer 95 and the magnet coil 96 of a timer 97. The timer 95 operates after a predetermined time limit to open the time delay switch 87, thereby opening the field circuit of the motor 55. The clutch 56, however, remains closed after the circuit of the motor 55 is opened.

The timer 97 serves to control the reversal of the main motor M for withdrawing the mold carriage, and effects such reversal after the required time interval for curing and hardening the molded material within the mold. The timer operates to move a switch arm 92 from a contact 98 to a contact 99. This opens the circuit of the magnet 88 so that the clutch valve is operated to release the clutch and disconnect the motor 55. The throwing of the switch 92 completes a circuit which controls the operation of the reversing switch 100 of the motor M, which circuit may be traced from main *b* through wire 93, to switch 92, 99, wire 101, magnet coil of switch 102, wire 103, contact bar 104 of switch 73, and wire 105 to main *c*. Switch 102 is thus operated to establish a circuit for the magnet coil 106 of the reversing switch 100. The circuit for coil 106 may be traced from main *b* through wire 93, switch 92, wire 101, wire 107, coil 106, wires 108, 103, 105 to main *c*. Reversing switch 100 is thus operated, thereby reversing the motor M which operates to withdraw the mold carriage. As the latter nears the limit of its mold-opening movement, the limit switch 73 is opened. This opens the circuit of the motor M and also moves the connected contact bar 104 to open position thereby opening the circuit for the relay which controls the reversing switch 100 which is therefore thrown to forward position preparatory to the next cycle of operations.

The operation of the safety mechanism is as follows:

Any obstructing material coming between the mold faces or in position to offer abnormal resistance to the closing movement of the mold carriage, will cause the driving element 40 to move forward relative to the carriage and compress the springs 50. This movement causes a switch contact 109 (Fig. 6) which may be mounted on the plate 44, to operate a microswitch 110 on the carriage thereby closing a circuit for the relay 102 for the reversing switch 100. This circuit may be traced from main b through switch 110, wire 111, switch 77, wires 112, 101, magnet coil of relay 102, wire 103, switch 104 and wire 105 to main c. When this circuit is thus closed, the relay 102 operates and causes operation of the reversing switch 100 so that the motor M is reversed and withdraws the mold carriage. The switch 77 in circuit with the switch 110 is opened by its cam 78, as heretofore described, when the mold is substantially closed, and thereby takes the relay 102 out of the control of the switch 110, so that the latter does not interfere with the normal continued operation of the motor M after the mold is closed.

If, after the mold is closed, an internal pressure is developed sufficient to separate the contacting faces of the mold and produce flashing or spreading of the molding material between the mold faces, the safety mechanism immediately operates to prevent a reclosing of the mold or the application of a high closing pressure while such material remains between the die faces. The opening movement of the mold when such internal pressure is developed withdraws the switch 77 from the cam 78 and allows the switch to close so that a circuit for the reversing switch is established, thereby reversing the motor and opening the mold in same manner as when any foreign body obstructs the mold closing movement as above described. The excess pressure by which the flashing is produced is a phenomenon which may be due to an expansion or increase in volume of the molding compound during cooling and hardening, or may be caused by a maladjustment on the part of the operator.

Modifications may be resorted to within the spirit and scope of my invention.

I claim:

1. A molding machine comprising a supporting frame, a pair of die plates including a stationary die plate mounted on said frame and a movable die plate mounted for movement toward and from the stationary die plate, said plates having meeting faces, a motor, a train of gearing connecting said motor with the movable die plate for causing said movements of the die plate, a second motor, speed reduction gearing providing driving connections from the second motor to the first mentioned gearing, automatic means for controlling the operation of said motors and causing the first motor to move the movable die plate to an approximately closed position and then causing the second motor to operate through said speed reduction gearing and apply greatly increased force to the movable die plate for completing the closing movement and holding the die plates together, a friction clutch interposed between said reduction gearing and said first mentioned gearing, and automatic means for holding the clutch open during said operation of the first motor and for actuating the clutch to effect said operation of the second motor.

2. A molding machine comprising a supporting frame, a pair of dies mounted thereon for relative movement to and from each other for closing and opening the dies, a main electric motor, a gear train providing a driving connection between the motor and a movable die for moving the latter to and from closed position, an auxiliary motor, power transmitting means including a rotary friction clutch and speed reduction gearing between the auxiliary motor and a gear of said gear train, and control means for said motors and clutch operable to cause said main motor to move the movable die forward to a substantially closed position and then to actuate the clutch and operate said auxiliary motor and cause it to complete the closing movement of the die and apply a holding pressure thereto.

3. A molding machine comprising a supporting frame, a pair of dies mounted thereon for relative movement to and from each other for closing and opening the dies, a main electric motor, a gear train providing a driving connection between the motor and a movable die for moving the latter to and from closed position, an auxiliary motor, speed reduction gearing between the auxiliary motor and a gear of said gear train, a friction clutch interposed between said speed reduction gearing and the gear driven thereby, and automatic means operable as the movable die nears its closed position to actuate said clutch and thereby complete a driving connection from the auxiliary motor to the die.

4. A molding machine comprising a supporting frame, a pair of dies mounted thereon for relative movement to and from each other for closing and opening the dies, a main electric motor, a gear train providing a driving connection between the motor and a movable die for moving the latter to and from closed position, an auxiliary motor, speed reduction gearing between the auxiliary motor and a gear of said gear train, a friction clutch interposed between said speed reduction gearing and the gear driven thereby, automatic means operable as the movable die nears its closed position to actuate said clutch and thereby complete a driving connection from the auxiliary motor to the die, automatic means comprising a timer device operable a predetermined time limit after said operation of the clutch, to cut off power from said auxiliary motor, and a second timer device operable after the clutch is released to reverse said main motor and cause it to withdraw the movable die.

5. A molding machine comprising a stationary frame, a pair of die plates including a die plate having a stationary mounting on the frame and a movable die plate, a carriage on which the movable plate is carried, said carriage being mounted for reciprocating movement by which the movable die plate is moved to and from a closed position in which the faces of the die plates meet, driving elements telescopically connected and mounted respectively in the stationary frame and on the carriage for bodily reciprocating movement therewith, said elements having oppositely-disposed helical driving surfaces and interposed driving balls, a main electric motor, a train of gearing connecting the motor with the driving element mounted in the frame, an auxiliary electric motor, speed reduction gearing interposed between said auxiliary motor and said train of gearing, and automatic means for controlling the operation of said motors and causing the main motor to move the movable die plate from open position to a substantially closed position and for then causing the auxiliary motor to apply a high pressure to the movable die plate and hold it in closed position.

6. A molding machine comprising a stationary frame, a pair of die plates including a die plate having a stationary mounting on the frame and a movable die plate, a carriage on which the movable plate is carried, said carriage being mounted for reciprocating movement by which the movable die plate is moved to and from a closed position in which the faces of the die plates meet, driving elements telescopically connected and mounted respectively in the stationary frame and on the carriage for bodily reciprocating movement therewith, said elements having oppositely-disposed helical driving surfaces and interposed driving balls, a main electric motor, a train of gearing connecting the motor with the driving element mounted in the frame, an auxiliary electric motor, speed reduction gearing interposed between said auxiliary motor and said train of gearing, automatic control mechanism comprising means for reducing the torque of the main motor as the movable die plate nears its closed position, and automatic means for bringing said auxiliary motor into activity after the movable die plate is substantially closed.

7. A molding machine comprising a stationary frame, a pair of die plates including a die plate having a stationary mounting on the frame and a movable die plate, a carriage on which the movable plate is carried, said carriage being mounted for reciprocating movement by which the movable die plate is moved to and from a closed position in which the faces of the die plates meet, driving elements telescopically connected and mounted respectively in the stationary frame and on the carriage for bodily reciprocating movement therewith, said elements having oppositely-disposed helical driving surfaces and interposed driving balls, a main electric motor, a train of gearing connecting the motor with the driving element mounted in the frame, an auxiliary electric motor, means for transmitting motion from the auxiliary motor to said train of gearing, springs providing a yielding driving connection between the carriage and the said driving element thereon and through which springs motion is transmitted to the carriage, said driving element on the carriage being bodily movable forward a limited distance against the force of said springs after the die plates are together, and electroresponsive means operated during said last mentioned movement for bringing the auxiliary motor into operation and causing it to apply a holding pressure to the movable die plate.

8. A molding machine comprising a stationary frame, a pair of die plates including a stationary die plate mounted on said frame, and a movable die plate, a carriage on which said movable die plate is carried, said carriage being mounted in said frame for reciprocating movement by which the movable die plate is moved to and from a closed position in which the die faces meet, driving elements for reciprocating the carriage comprising a drive shaft journaled for rotation in the machine frame and extending in the direction of movement of the carriage and a second driving element telescopically connected with said drive shaft, said elements having opposite-disposed helical driving ribs providing a helical groove, power-transmitting balls mounted in said groove, said drive shaft being arranged with its axis perpendicular to and at the center of the movable die plate whereby the pressure of the driving elements is symmetrically distributed over the meeting faces of the dies, a main electric motor, a train of gears connecting the motor with the drive shaft, an auxiliary electric motor, speed reduction gearing between the auxiliary motor and the said gear train, and automatic control means for said motors for causing the main motor to move the movable die plate toward and from a closed position and for causing the auxiliary motor to apply a driving torque to said drive shaft after the die plates are substantially closed and thereby apply a holding pressure.

9. A molding machine comprising a pair of die plates relatively movable to and from a closed position, a driving element mounted for rotation, means providing driving connections between the driving element and the die plates by which rotation of the driving element imparts said relative movement to the die plates, a main electric motor geared to the driving element for rotating it and thereby causing said relative movement of the die plates, an auxiliary motor, means for transmitting motion from the auxiliary motor to the said driving element and by which operation of the auxiliary motor imparts a driving torque to the driving element, said last mentioned means comprising speed reduction gearing connecting the auxiliary motor to the driving element, and automatic control means by which the auxiliary motor is brought into activity when the die plates are substantially closed and thereby operates to apply an increased driving torque to the driving element.

10. A molding machine comprising a pair of die plates relatively movable to and from a closed position, a driving element, means providing operating connections between said driving element and the die plates, a main electric motor geared to said driving element for effecting said relative movement of the die plates, an auxiliary motor, a friction clutch interposed between said auxiliary motor and the said driving element, and automatic means for holding the clutch open during said operation of the main motor and for connecting the clutch members and thereby completing a driving connection between the auxiliary motor and said driving element.

11. A molding machine comprising a pair of die plates relatively movable to and from a closed position, a driving element, means providing operating connections between said driving element and the die plates, a main electric motor geared to said driving element for effecting said relative movement of the die plates, an auxiliary motor, a friction clutch interposed between said auxiliary motor and the said driving element, automatic means for holding the clutch open during said operation of the main motor and for connecting the clutch members and thereby completing a driving connection between the auxiliary motor and said driving element, automatic means for disconnecting the clutch members a predetermined time limit after the die plates are closed, and automatic means for reversing the main motor and opening the die plates after said disconnection of the clutch members.

12. A molding machine comprising a pair of die plates having meeting faces, a frame on which one said die plate is mounted, a carriage on which the other plate is mounted, said carriage being mounted for reciprocation for moving the movable die plate to and from a closed position, a driving element mounted to reciprocate with the carriage, spring means forming a driving connection between the said driving element and the carriage, a main electric motor geared to said driving element and operating through the latter to move the carriage and close the dies and thereafter continue the movement of said driving element, an auxiliary motor geared to the carriage, and means operable automatically by the relative movement of said driving element and carriage to bring said auxiliary motor into operation.

13. A molding machine comprising a pair of die plates having meeting faces, a frame on which one said die plate is mounted, a carriage on which the other plate is mounted, said carriage being mounted for reciprocation for moving the movable die plate to and from a closed position, a driving element mounted to reciprocate with the carriage, spring means forming a driving connection between the said driving element and the carriage, a main electric motor geared to said driving element and operating through the latter to move the carriage and close the dies, an auxiliary electric motor, means providing driving connection between the auxiliary motor and said driving element, and electroresponsive means operable by the relative movement of said driving element and the carriage when the dies are closed and increase the back pressure on the carriage, said electroresponsive means being operable to energize the auxiliary motor.

14. A molding machine comprising a pair of die plates having meeting faces, a frame on which one said die plate is mounted, a carriage on which the other plate is mounted, said carriage being mounted for reciprocation for moving the movable die plate to and from a closed position, a driving element mounted to reciprocate with the carriage, spring means forming a driving connection between the said driving element and the carriage, a main electric motor geared to said driving element and operating through the latter to move the carriage and close the dies, an auxiliary electric motor, gearing including a clutch providing driving connection between the auxiliary motor and said driving element, an electromagnet, means operable thereby for operating the clutch, and means operable by the take-up movement of said driving element when the die is closed for closing a circuit for the electromagnet and thereby operating the clutch and effecting a driving connection between the auxiliary motor and said driving element.

15. A molding machine comprising a pair of die plates having meeting faces, a frame on which one said die plate is mounted, a carriage on which the other plate is mounted, said carriage being mounted for reciprocation for moving the movable die plate to and from a closed position, a driving element mounted to reciprocate with the carriage, spring means forming a driving connection between the said driving element and the carriage, a main electric motor geared to said driving element and operating through the latter to move the carriage and close the dies and thereafter continue the movement of said driving element, an auxiliary motor geared to the carriage, means operable automatically by the relative movement of said driving element and carriage to bring said auxiliary motor into operation, safety means for stopping the main motor when resistance to the forward movement of the carriage is increased beyond a predetermined limit by any obstruction to said movement of the carriage, and means operable automatically when the carriage reaches a die-closing position to render said safety mechanism inoperative.

16. A molding machine comprising a pair of die plates having meeting faces, and formed with a mold cavity, means for mounting said plates for relative movement to and from a closed position, a driving element mounted for a movement with one said die plate, means comprising a power motor for applying a driving force to said element and thereby moving the die plates together, said driving element being guided in a straight line and positioned and arranged to cause a uniform distribution of the driving force over the meeting faces of the die plates, said driving member having a helical bearing surface, a complemental driving element, bearing balls between said driving elements and bearing on said helical surface, means including a second power motor for applying an increased driving torque to one of said driving elements, and automatic means for bringing said second power motor into operation when the die plates are brought together.

17. The combination of an electric motor, a driven element mounted for movement to a stop position, power transmitting mechanism between the motor and said element through which power is transmitted for moving said element to the stop position, an auxiliary electric motor, and automatic means operable by the back pressure when said element is stopped to bring said auxiliary motor into operation and cause it to apply increased driving force to said element independently of power supplied by said first mentioned motor.

18. The combination of a motor, a driven element mounted for movement, power transmitting mechanism providing driving connection between the motor and said element, said mechanism including telescopically arranged members formed with opposite helical driving surfaces, one said member being rotatably mounted and geared to the motor for rotation thereby and the other said member being connected to said driven element for moving the latter to a stop position, a second motor, means including a clutch providing driving connections between said second motor and said rotary member, said clutch comprising a driving member and a driven member held disconnected during said movement of said driven element, and automatic means for connecting the clutch members and causing said second motor to apply an increased driving torque to said rotary member when said element has been brought to a predetermined stop position.

CONRAD JOBST.

REFERENCES CITED

The following references are of record in the file of this patent:

UNITED STATES PATENTS

| Number | Name | Date |
| --- | --- | --- |
| 2,034,157 | Stacy | Mar. 17, 1936 |
| 2,088,134 | Haessler | July 27, 1937 |
| 2,111,857 | Jeffery | Mar. 22, 1938 |
| 2,269,389 | Weida | Jan. 6, 1942 |
| 2,370,622 | Gastrow | Mar. 6, 1945 |
| 2,372,833 | Jobst | Apr. 3, 1945 |